J. J. DEWEY.
HARVESTER.
No. 177,480.  Patented May 16, 1876.
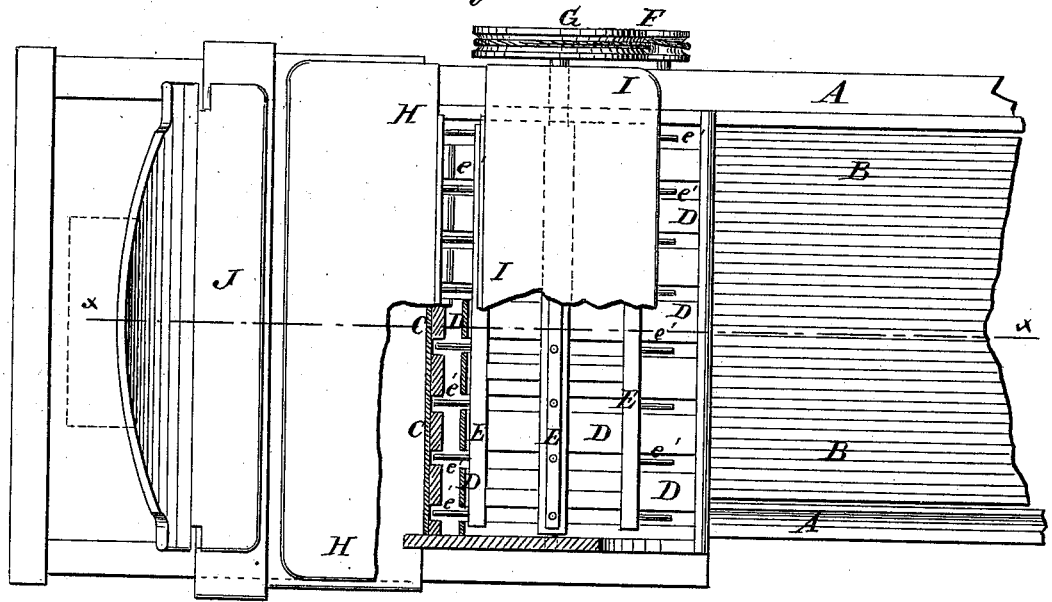
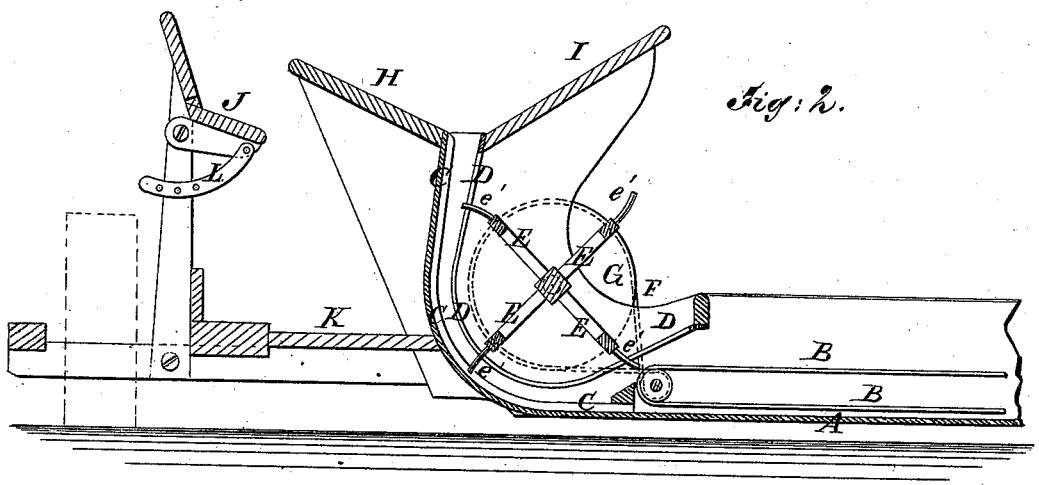

UNITED STATES PATENT OFFICE.

JOHN J. DEWEY, OF HAY CREEK, (RED WING P. O.,) MINNESOTA.

IMPROVEMENT IN HARVESTERS.

Specification forming part of Letters Patent No. 177,480, dated May 16, 1876; application filed December 12, 1874.

*To all whom it may concern:*

Be it known that I, JOHN J. DEWEY, of Hay Creek, (Red Wing P. O.,) in the county of Goodhue and State of Minnesota, have invented a new and useful Improvement in Binding Attachment for Harvesters, of which the following is a specification:

Figure 1 is a top view of a harvester-platform to which my improvement has been applied, part being broken away to show the construction. Fig. 2 is a vertical section of the same, taken through the line $x\ x$, Fig. 1.

Similar letters of reference indicate corresponding parts.

The invention will first be fully described, and then pointed out in the claim.

A represents the platform of the harvester, which is provided with an endless apron, B, upon which the cut grain falls, and by which it is carried to the inner end of the said platform A, where it falls into the space between the lower ends of the two shells C and D, which ends are spread apart to receive the roller of the endless apron between them. The lower end of the upper shell D is extended over the inner part of the endless apron B, to serve as a guide or hopper to direct the cut grain into the space between the said shells C D. The upper shell, D, is slotted longitudinally, and the lower shell, C, has grooves formed in it directly opposite the slots of the shell D to receive the teeth of the elevating-wheel E, the journals of which revolve in bearings in uprights attached to the framework of the harvester, and which is driven from the driving mechanism of the harvester by an endless chain or band, F, that passes around a chain-wheel or pulley, G, attached to the journal of the said wheel E. The wheel E is formed by attaching four or more sets of arms to a shaft, and attaching a cross-bar to the outer ends of the arms of each set. To the cross-bars of the wheel E are attached teeth $e'$, of such a length as to pass through the slots of the upper shell, D, and enter the grooves of the lower shell, C, so as to take the cut grain as it is delivered from the endless apron B, and carry it up through the space between said shells C D. The upper parts of the shells C D extend up vertically, so that as the teeth $e'$ of the wheel E approach the upper ends of said shells they will be gradually withdrawn. The teeth $e'$ are slightly curved to the rearward to facilitate their withdrawal from the grain between the shells C D. To the upper end of the rear shell C is attached a table, H, and to the upper end of the forward or upper shell D is attached a table, I. The tables H I incline upward, as shown in Fig. 2, to receive and hold the gavel while being bound. The table H is permanently attached to its supports, but the table I should be adjustable so that it may be moved forward or back to enlarge or contract the space between the shells C D, as may be required. J is the seat upon which the binders sit, and which is hinged to its supports, so that it may be adjusted at any desired angle, or turned down out of the way should the binders desire to stand upon the platform K. To the seat J are attached curved arms L, which project downward and rearward across the supports for the seat J, and have numerous holes formed in them to receive pins for securing the seat into any position into which it may be adjusted.

Having thus described my invention, I claim as new and desire to secure by Letters Patent—

The slotted shell D, the grooved shell C, the elevating-wheel E, and the inclined tables H I, in combination with each other and a harvester-platform, substantially as herein shown and described.

JOHN J. DEWEY.

Witnesses:
MARTIN S. CHANDLER,
W. H. PURDY.